Z. LITTMAN.
TOOL HANDLE.
APPLICATION FILED MAY 23, 1912.
1,045,047.
Patented Nov. 19, 1912.
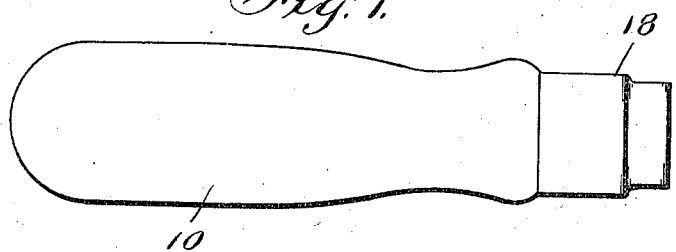
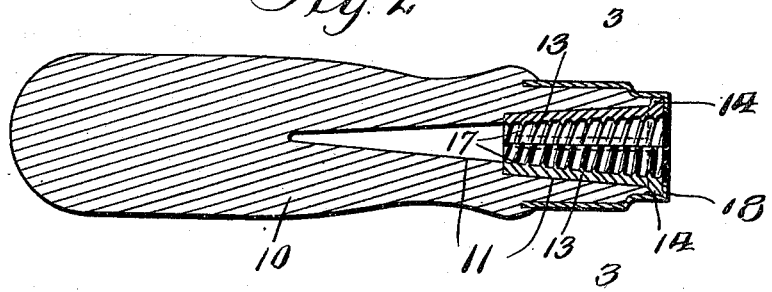
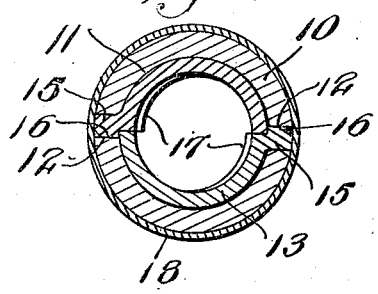
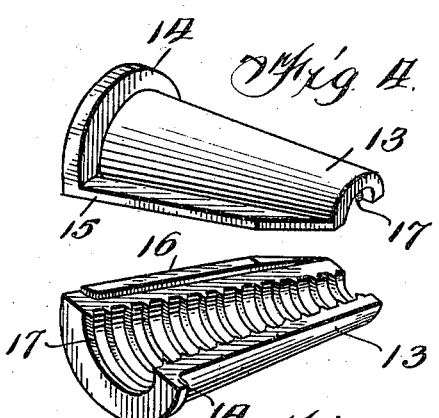
Witnesses:
Inventor
Zeno Littman,
By
Attorneys

UNITED STATES PATENT OFFICE.

ZENO LITTMAN, OF NEW YORK, N. Y.

TOOL-HANDLE.

1,045,047.

Specification of Letters Patent.   Patented Nov. 19, 1912.

Application filed May 23, 1912. Serial No. 699,244.

*To all whom it may concern:*

Be it known that I, ZENO LITTMAN, a citizen of the United States, residing at New York, in the county of New York and State of New York, have invented certain new and useful Improvements in Tool-Handles; and I do hereby declare the following to be a full, clear, and exact description of the invention, such as will enable others skilled in the art to which it appertains to make and use the same.

My invention relates to tool handles and more particularly to that class to be used for files or other tools having tapered tangs.

An object of my invention is to provide a handle to receive the tang of a tool from stock before any other operation is performed therein, said handle gripping said tang so as to securely hold or bind said tool within the handle thereby avoiding accidents common to the usage of tools with ordinary handles such as for instance in the return stroke of a file the pulling of the handle from the file so that in the cutting stroke the hand gripping the handle forcibly engaging the sharp end of the tang thereby injuring the hand.

A further object of my invention is the provision of a handle for tools having tangs, hardened members carried by the handle to receive and engage said tang, said hardened members engaging the tang and forming threads thereon in such a way that with but a few threads formed in the hardened members, double the amount of threads are cut upon the tang of the tool to assure better gripping means.

Further objects will be apparent from the following specification, appended claims and drawings, in which, Figure 1 is an elevation of a handle constructed in accordance with my invention, Fig. 2 is a sectional view therethrough, Fig. 3 is a cross section therethrough as on the line 3—3 of Fig. 2, and, Figs. 4 and 5 are perspective views of one of the clamping members from opposite sides.

Although dies have been made of harder metal than the material they are intended to thread, it has never been shown that engaging means carried by a handle have been adapted to engage the tang of a file or the like and notwithstanding the fact that threaded sockets have been inserted in tool handles and that threaded tangs have been inserted therein, that art has never been reduced to practice because of the necessary operations to produce the desired result and which necessary operations are not accessible to the average mechanic.

In a co-pending application, Serial Number 660,939 I have shown the art of making a tool handle having a tapering, internally threaded, hardened socket which is adapted to engage the tang of a file or the like on which this application is an improvement.

This invention comprises the usual handle 10 which may be provided with the stepped tapering bore 11 which is provided on opposite sides thereof with slots 12. In the enlarged portion of the bore 11 socket members 13 are inserted which members when assembled form the tapering threaded bore. In that the socket members are duplicates of one another, the description of one holds equally well for both, and said member is provided with a flange 14 about the enlarged end thereof which flange bears against the end of the handle 10. One side of said member is provided with the longitudinal flange 15 which to one side is plain and to the opposite side a rib 16 is formed thereon which rib serves as a locking member when two of such members are assembled and prevents the displacement of one from the other. This member is provided with threads 17 which are spaced apart and when two of said members are assembled, the threads of one engage the tang of a tool between the threads of the other so that with but a few threads in each of the members double the amount of threads are formed upon the tang of a tool. In the particular construction of these members, the cutting end with threads of each member is between the opposite end of the threads of the opposite member so that a more perfect action is produced than by a continuous thread, the socket members 13 after having been inserted into the handle with the flanges 15 in the slots 12, a ferrule 18 is then placed upon the end of the handle which ferrule engages the socket members and holds the same from displacement.

I am aware that various modifications may be made within the scope of my invention and the drawings are submitted for illustrative purposes only.

Having thus described my invention, I claim:

1. In a tool handle, a pair of complementary socket members presenting a longitudinally divided socket, said socket members interlocking and having flanges along their edges, said handle being slotted to receive said flanges, said socket members being internally threaded and so arranged that the threads of one member are between those of the other, a ferrule secured to said handle to hold said members against displacement, said socket members receiving an ordinary tang of a tool and gripping the same by rotation thereof.

2. In a tool handle, companion socket members held therein against rotation, said socket members presenting a longitudinally divided socket, threads formed in each of said members, the threads of one member coming between those of the other, said socket being adapted to receive an ordinary tang of a tool and said socket members gripping and engaging said tang upon rotation of the handle.

3. In combination with a tang of a tool and a handle, companion socket members held in said handle against rotation, said socket members presenting a longitudinally divided socket, flanges formed on each of said members, said handle being slotted to receive said flanges and ribs formed on said flanges, said ribs holding said members in substantially locked position, threads formed in said socket members to engage and grip the tang of a tool.

4. In a tool handle, a handle having a recessed and slotted end, companion socket members of sufficient length to receive the major portion of a tang of a tool, inserted in said recessed handle against rotation, said socket members presenting a longitudinally divided socket, each of said socket members being internally threaded and having a flange extending from the wall thereof, a rib formed on said flange the threads of one member cutting between those of another when said socket members are assembled and said socket members being of harder metal than the ordinary tang of a tool to grip and bind the ordinary tang of a tool therein by rotation.

In testimony whereof I affix my signature in presence of two witnesses.

ZENO LITTMAN.

Witnesses:
GEORGE L. THOM,
HUGO MOCK.

---

Copies of this patent may be obtained for five cents each, by addressing the "Commissioner of Patents, Washington, D. C."